United States Patent
Sabater et al.

(10) Patent No.: US 10,957,021 B2
(45) Date of Patent: Mar. 23, 2021

(54) METHOD FOR RENDERING A FINAL IMAGE FROM INITIAL IMAGES ACQUIRED BY A CAMERA ARRAY, CORRESPONDING DEVICE, COMPUTER PROGRAM PRODUCT AND COMPUTER-READABLE CARRIER MEDIUM

(71) Applicant: INTERDIGITAL CE PATENT HOLDINGS, Paris (FR)

(72) Inventors: Neus Sabater, Cesson-Sevigne (FR); Matthieu Hog, Cesson-Sevigne (FR); Guillaume Boisson, Cesson-Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/465,094

(22) PCT Filed: Nov. 24, 2017

(86) PCT No.: PCT/EP2017/080296
§ 371 (c)(1),
(2) Date: May 29, 2019

(87) PCT Pub. No.: WO2018/099813
PCT Pub. Date: Jun. 7, 2018

(65) Prior Publication Data
US 2019/0318458 A1    Oct. 17, 2019

(30) Foreign Application Priority Data
Nov. 30, 2016    (EP) .................................... 16306585

(51) Int. Cl.
*H04N 5/225*    (2006.01)
*G06T 5/00*    (2006.01)
(Continued)

(52) U.S. Cl.
CPC ................. *G06T 5/002* (2013.01); *G06T 5/50* (2013.01); *G06T 7/557* (2017.01); *G06T 7/90* (2017.01);
(Continued)

(58) Field of Classification Search
CPC ........... H04N 5/247; H04N 9/09; G06T 5/002
(Continued)

(56) References Cited

U.S. PATENT DOCUMENTS 8,514,491 B2    8/2013    Duparre
8,831,367 B2    9/2014    Venkataraman et al.
(Continued)

FOREIGN PATENT DOCUMENTS

JP    201325649    2/2013
JP    2013175821    9/2013
WO    WO2014073756    5/2014

OTHER PUBLICATIONS

Wilburn et al.—"High performance imaging using large camera arrays"—ACM Transactions on Graphics (TOG)—Jul. 1, 2005 (Jul. 1, 2005)—pp. 765-776—XP055204600.*
(Continued)

*Primary Examiner* — Usman A Khan
(74) *Attorney, Agent, or Firm* — Lily Neff (57) ABSTRACT

A method for rendering an image, called a final image, from at least one image acquired by a camera array, is provided. According to such a method, the determination of a color value for at least one pixel of the final image, called a current pixel, comprises:
for at least one initial image acquired by the camera array, obtaining a color value of a pixel associated with said current pixel within said at least one initial image, acquiring at least one color value called a real color value;

(Continued)

computing at least one interpolated color value, from said at least one real color value;

determining the color value for said current pixel, as a function of said at least one real color value and said at least one interpolated color value.

11 Claims, 5 Drawing Sheets

(51) Int. Cl.
    *G06T 7/90*     (2017.01)
    *G06T 7/557*     (2017.01)
    *G06T 5/50*     (2006.01)
    *H04N 5/247*     (2006.01)
    *H04N 9/09*     (2006.01)

(52) U.S. Cl.
    CPC ............... *H04N 5/247* (2013.01); *H04N 9/09* (2013.01); *G06T 2207/10024* (2013.01); *G06T 2207/10052* (2013.01)

(58) Field of Classification Search
    USPC ...................................................... 348/218.1
    See application file for complete search history.

(56) References Cited

U.S. PATENT DOCUMENTS

| | | | |
|---|---|---|---|
| 9,237,269 B2 | 1/2016 | Ono et al. | |
| 2011/0122308 A1 | 5/2011 | Duparre | |
| 2011/0170776 A1* | 7/2011 | Ueda | H04N 9/04515 |
| | | | 382/167 |
| 2013/0222633 A1 | 8/2013 | Knight et al. | |
| 2014/0184861 A1 | 7/2014 | Georgiev et al. | |
| 2015/0304557 A1* | 10/2015 | Choi | H04N 5/2258 |
| | | | 348/218.1 |
| 2015/0348239 A1 | 12/2015 | Nestares et al. | |

OTHER PUBLICATIONS

Vaish etal.—"Synthetic aperture focusing using a shear-warp factorization of the viewing transform"—2005 IEEE Computer Society Conference on Computer Vision and Pattern Recognition (CVPR'05)—Workshops—Sep. 21-23, 2005.

Huang etal.—"Fast realistic block-based refocusing for sparse light fields"—2016 IEEE International Symposium on Circuits and Systems (ISCAS)—May 22-25, 2016.

International Search Report for PCT/EP2017/080296 dated Feb. 9, 2018.

* cited by examiner

METHOD FOR RENDERING A FINAL IMAGE FROM INITIAL IMAGES ACQUIRED BY A CAMERA ARRAY, CORRESPONDING DEVICE, COMPUTER PROGRAM PRODUCT AND COMPUTER-READABLE CARRIER MEDIUM

This application claims the benefit, under 35 U.S.C. § 365 of International Application PCT/EP2017/080296, filed Nov. 24, 2017, which was published in accordance with PCT Article 21(2) on Jun. 7, 2018 in English and which claims the benefit of European patent application 16306585.7, filed Nov. 30, 2016.

1. FIELD OF THE DISCLOSURE

The present disclosure lies in the field of camera arrays, and relates to a technique for rendering a final image from initial images acquired by a camera array. More precisely, the disclosure pertains to a technique for performing light-field refocusing from data acquired with a camera array. In particular, the proposed technique allows reducing angular aliasing in out-of-focus parts of the final image.

2. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Image acquisition devices project a three-dimensional scene onto a two-dimensional sensor. During operation, a conventional capture device captures a two-dimensional (2D) image of the scene representing an amount of light that reaches a photosensor within the device. However, this 2D image contains no information about the directional distribution of the light rays that reach the photosensor, which may be referred to as the light-field. Depth, for example, is lost during the acquisition. Thus, a conventional capture device does not store most of the information about the light distribution from the scene.

Light-field capture devices also referred to as "light-field data acquisition devices" have been designed to measure a four-dimensional (4D) light-field of the scene by capturing the light from different viewpoints of that scene. Thus, by measuring the amount of light traveling along each beam of light that intersects the photosensor, these devices can capture additional optical information, e.g. about the directional distribution of the bundle of light rays, for providing new imaging applications by post-processing. The information acquired by a light-field capture device is referred to as the light-field data. Light-field capture devices are defined herein as any devices that are capable of capturing light-field data. There are several types of light-field capture devices, among which:
- plenoptic devices, which use a microlens array placed between the image sensor and the main lens, as described in document US 2013/0222633;
- camera arrays, as described by Wilburn et al. in *"High performance imaging using large camera arrays."* ACM Transactions on Graphics (TOG) 24, no. 3 (2005): 765-776 and in patent document U.S. Pat. No. 8,514,491 B2.

Figure 1A:
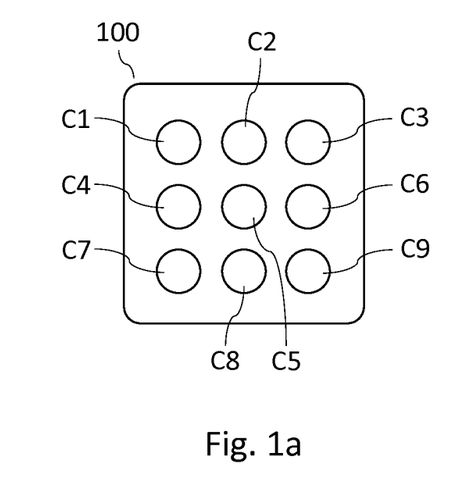
FIGS. 1a and 1b, already described, present a simplified example of structure of a camera array that may be used to obtain the initial images used to render a final image, according to an embodiment of the present disclosure.

The present disclosure focuses more precisely on light-field data captured by a camera array. Whereas a plenoptic device relies on a microlens array to capture the light from different viewpoints of a scene, a camera array can be seen (in a much-simplified model) as an arrangement of calibrated conventional cameras (such an arrangement is sometimes referred to as a camera rig). For example, FIG. 1a is a simplified diagram illustrating a camera array comprising nine cameras (C1, C2, ... C9) arranged in a same plane, as a three-by-three grid. Each camera acquires its own image, thus allowing capturing at a same time nine images (I1 acquired by camera C1, I2 acquired by camera C2, ... I9 acquired by camera C9) of a same scene Sc seen from nine slightly different points of view, as further presented in relation with FIG. 1b. If well calibrated, a camera array allows performing what is known as "synthetic aperture refocusing" (or "synthetic aperture focusing") in the literature. Synthetic aperture refocusing is a technique for simulating the defocus blur of a large aperture lens by using multiple images of a scene. It consists in acquiring initial images of a scene from different viewpoints (for example with a camera array), projecting them onto a desired focal surface, and computing their average. In the resulting image, points that lie on the focal surface are aligned and appear sharp, whereas points off this surface are blurred out due to parallax. From a light-field capture device such as a camera array, it is thus possible to render a collection of images of a scene, each of them being focused at a different focalization distance. Such a collection is sometimes referred to as a "focal stack". Thus, one application of light-field data processing comprises notably, but is not limited to, generating refocused images of a scene.

However, while refocusing results with plenoptic cameras are pretty convincing, synthetic aperture refocusing with camera arrays still creates unpleasant results mainly due to the poor quality of the blur within out-of-focus region of the rendered image. Indeed, sharp regions of the rendered image are well aligned as soon as the camera array is well calibrated, but blurred regions are rendered as an addition of all initial images. Due to this shift and add process, and because of the poor angular sampling of the light-field in a camera array (especially when the number of cameras in the camera array is not very high), angular aliasing may appear in the out-of-focus regions of the rendered image. Such an angular aliasing, which takes the form of a kind of pattern repetition within the blurred regions of the rendered image, is for example usually clearly visible when the synthetic aperture refocusing is performed from initial images acquired by a three-by three or a four-by-four camera array. Angular aliasing becomes even more apparent in blurred region having high defocus degree with respect to in-focus regions of the rendered image. Camera arrays comprising much more cameras may be built to increase the angular sampling of the light-field and improve the quality of the blur in out-of-focus regions of the rendered images, but this solution is suboptimal, since the amount of data quickly becomes unmanageable and complicates the calibration process. The number of cameras within a camera array is therefore usually de facto limited, due to several constraints such as technical, design or cost constraints. This is especially true when the camera array is to be embedded into a relatively small device, such as a smartphone for example, with compact design and limited computational power.

It would hence be desirable to provide a technique for rendering a final image from initial images acquired by a camera array that would avoid at least one of these drawbacks of the prior art.

3. SUMMARY

According to an aspect of the present disclosure, a method for rendering an image, called a final image, from at least one image acquired by a camera array, is provided. According to this method, the determination of a color value for at least one pixel of the final image, called a current pixel, comprises:

- for at least one initial image acquired by the camera array, obtaining a color value of a pixel associated with said current pixel within said at least one initial image, acquiring at least one color value called a real color value;
- computing at least one interpolated color value, from said at least one real color value;
- determining the color value for said current pixel, as a function of said at least one real color value and said at least one interpolated color value.

In this manner, the proposed technique offers a way to reduce the angular aliasing and to improve the quality of blur in final images rendered from initial images acquired by a camera array, with respect to final images rendered using a classical prior art synthetic aperture refocusing technique. Indeed, the use of interpolated color values in addition to real color value to determine the color value of a pixel of an image to be rendered allows simulating a better angular sampling of the light-field captured by a camera array. The interpolation of color values may thus be considered, to some extend, as the interpolation of virtual cameras placed between or beside the real cameras of the camera array. The proposed technique also allows rendering images with a blur model that can change for every pixel or group of pixels within the rendered image, and thus gives the possibility to render images with artistic blur styles that are not feasible with a conventional camera.

According to an embodiment, the rendering of said final image is performed from at least two initial images acquired by the camera array, and the determination of a color value for said at least one pixel of the final image, called a current pixel, comprises:

- for at least two initial images acquired by the camera array, obtaining a color value of a pixel associated with said current pixel within each of said at least two initial images, called a real color value, delivering a set of at least two real color values;
- computing at least one interpolated color value, from at least two real color values among said set of at least two real color values, delivering a set of at least one interpolated color value;
- determining the color value for said current pixel, as a function of at least one real color value among said set of at least two real color values and at least one interpolated color value among said set of at least one interpolated color value.

According to an embodiment, the current pixel is an out-of-focus pixel, belonging to a blurred region of said final image.

In that way, some interpolated color values are computed only for pixels belonging to an out-of-focus region of the final image to be rendered. Color values for in-focus pixels, belonging to sharp regions of the final image, may thus be determined only from real color values obtained within initial images acquired by the camera array, as in prior art synthetic aperture refocusing technique, which already gives good result in such sharp regions. In this manner, only the out-of-focus regions of the final image to be rendered, which are the regions in which the angular aliasing is likely to appear, are targeted by the proposed technique. This allows improving the rendered blur within out-of-focus regions, while at the same time saving computational power by avoiding computing unnecessary interpolated color values for pixels appearing sharp within the final image (sharp regions of the final image being already rendered in a pretty good quality—about the same quality as the initial images—with a classical synthetic aperture refocusing technique).

According to an embodiment, computing at least one interpolated color value from said at least one real color value comprises performing a nearest neighbors interpolation.

In that way, the interpolation of new color values from real color values is performed using an interpolation technique that produces, at a small computational cost, satisfying results in terms of diminution of the angular aliasing within out-of-focus regions of the final image to be rendered.

According to an embodiment, computing at least one interpolated color value consists in computing a number of interpolated color values, said number being a function of a difference between a depth of said current pixel and a depth of an in-focus region of said final image.

In that way, the number of interpolated color values used in addition to real color values to determine a color value of an out-of-focus current pixel of the final image to be rendered may be adapted as a function of a defocus degree of this current pixel.

More particularly, according to an embodiment, said number of interpolated color values increases as said difference between a depth of said current pixel and a depth of an in-focus region of said final image increases.

In that way, the higher the defocus degree of a current out-of-focus pixel is, the higher the number of interpolated color values contributing to determine the color value for this current pixel is. In other words, more color values are interpolated in regions where the angular aliasing is most likely to be visible, i.e. in out-of-focus regions having high defocus degree with respect to in-focus regions of the rendered image. In that way, the computational cost of the implementation of the proposed technique is optimized, while still preserving good blur rendering quality at every defocus depth.

According to another embodiment, said at least one real color value and said at least one interpolated color value used to determine the color value for said current pixel are determined as a function of a predetermined blur shape.

In that way, a predetermined shape of a virtual synthetic aperture to be rendered may be defined by interpolating only the specific interpolated color values and by selecting only the specific real color values that will contribute to form that shape. Since the aperture shape contributes to determine the blur shape within out-of-focus regions of the final image, the proposed technique thus offers many rendering possibilities. For example, it allows a user to choose the blur shape (also referred to as "bokeh shape") to apply within out-of-focus regions of the final image. The blur shape may even change across the different out-of-focus regions of the rendered image, for example depending on their depths.

According to an embodiment, determining the color value for said current pixel comprises determining an arithmetic average of said at least one real color value and said at least one interpolated color value.

According to another embodiment, determining the color value for said current pixel comprises determining a weighted average of said at least one real color value and said at least one interpolated color value.

In that way, color values—real and interpolated—may be weighted differently before averaging them, so that different rendering possibilities may be provided. For example, a Gaussian kernel may be applied to these values, giving a higher weight to the camera at the centre of a camera array, and a smaller one to the border cameras.

The present disclosure also concerns a device for rendering an image, called a final image, from at least one image acquired by a camera array. Said device comprises, for the determination of a color value for at least one pixel of the final image, called a current pixel:
- a module for obtaining, for at least one initial image acquired by the camera array, a color value of a pixel associated with said current pixel within said at least one initial image, acquiring at least one color value called a real color value;
- a module for computing at least one interpolated color value, from said at least one real color value;
- a module for determining the color value for said current pixel, as a function of said at least one real color value and said at least one interpolated color value.

According to one implementation, the different steps of the method for rendering a final image as described here above are implemented by one or more software programs or software module programs comprising software instructions intended for execution by a data processor of an apparatus for rendering a final image from at least one image acquired by a camera array, these software instructions being designed to command the execution of the different steps of the methods according to the present principles.

A computer program is also disclosed that is capable of being executed by a computer or by a data processor, this program comprising instructions to command the execution of the steps of a method for rendering a final image from at least one image acquired by a camera array, as mentioned here above.

This program can use any programming language whatsoever and be in the form of source code, object code or intermediate code between source code and object code, such as in a partially compiled form or any other desirable form whatsoever.

The information carrier can be any entity or apparatus whatsoever capable of storing the program. For example, the carrier can comprise a storage means such as a ROM, for example a CD ROM or a microelectronic circuit ROM or a magnetic recording means, for example a floppy disk or a hard disk drive.

Again, the information carrier can be a transmissible carrier such as an electrical or optical signal which can be conveyed via an electrical or optical cable, by radio or by other means. The program according to the present principles can be especially uploaded to an Internet type network.

As an alternative, the information carrier can be an integrated circuit into which the program is incorporated, the circuit being adapted to executing or to being used in the execution of the methods in question.

According to one embodiment, the methods/apparatus may be implemented by means of software and/or hardware components. In this respect, the term "module" or "unit" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc.) and is capable of accessing hardware resources of this physical entity (memories, recording media, communications buses, input/output electronic boards, user interfaces, etc.).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

A non-transitory processor readable medium having stored thereon such a program is also disclosed.

It is to be understood that both the foregoing general description and the following detailed description are exemplary and explanatory and are not restrictive of the disclosure, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

4. BRIEF DESCRIPTION OF THE DRAWINGS

Embodiments of the present disclosure can be better understood with reference to the following description and drawings, given by way of example and not limiting the scope of protection, and in which.

The components in the figures are not necessarily to scale, emphasis instead being placed upon illustrating the principles of the disclosure.

5. DETAILED DESCRIPTION

The general principle of the present disclosure relies on a peculiar technique for rendering an image, called a final image, from at least one image acquired by a camera array.

As it will be described more fully hereafter with reference to the accompanying figures, it is proposed in one aspect of the present disclosure to use some interpolated color values, in addition to real color values obtained within the initial images acquired by a camera array, to determine the color value of at least one pixel of a final image to be rendered. In at least one embodiment, the disclosure aims at rendering refocused images in which the angular aliasing in out-of-focused regions is reduced, compared to the angular aliasing that is visible in out-of-focused regions of images rendered with prior art synthetic aperture refocusing technique performed on initial images acquired by a camera array. In other words, one objective of the proposed technique is to provide a blur of better quality in out-of-focus regions of refocused images rendered from initial images acquired by a camera array.

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

While not explicitly described, the present embodiments and variants may be employed in any combination or sub-combination.

Some aspects of the general principle of prior art synthetic aperture refocusing technique are now briefly presented, for a better understanding of the various aspects of the present disclosure that will be introduced afterwards. As already mentioned in relation with prior art, synthetic aperture refocusing is a well-known technique that may be used to render a final image from initial images acquired by a camera array. It allows approximating a camera with a large aperture, by aligning, shifting and averaging the initial images acquired by a camera array. By varying the shift, it is possible to focus this synthetic camera at different depths. Synthetic aperture refocusing may thus be used to generate a focal stack from initial images acquired by a camera array. A focal stack is a collection of images of the scene, each of them being focused at a different focalization distance. Images of the focal stack are sometimes referred to as slices of the focal stack. From a focal stack, it is in particular possible to generate extended depth-of-field images, by focus fusion: the in-focus region is detected in each image of a subset of images of the focal stack, then all these in-focus regions are combined to form an extended depth-of-field image.

The process for rendering a slice of focal stack from initial images acquired by a camera array is now briefly explained, at a pixel level. Let assume that the N cameras of a camera array are calibrated, and that we want to render an image $S^d$, corresponding to the slice of focal stack focused at a focalization distance d from the viewpoint of the i-th camera of the camera array. The image plane of $S^d$ thus coincides with the image plane of the i-th camera of the camera array. The camera array has been calibrated to fit a predetermined model (for example a classical pinhole projection model, or a distorted pinhole projection model). As a result, for each camera of the camera array, a variety of parameters that are well-known in the literature—such as camera pose matrix, intrinsic matrix, extrinsic matrix, etc.—have already been determined. Using these parameters, it is notably possible to retrieve the corresponding point in the 3D scene at a depth d from the i-th camera of a pixel x belonging to the image plane of the i-th camera. It is then possible to retrieve the pixel $x_j^d$ corresponding to the projection of such a scene point in the j-th camera image plane. In other words, a pixel corresponding to the projection of a 3D scene point can be retrieve in each initial image acquired by a camera array.

The color value of a pixel x of the slice $S^d$ of focal stack rendered at distance d can thus be computed as:

$$S^d(x) = \frac{1}{N}\left(I_i(x) + \sum_{\substack{j=1 \\ j \neq i}}^{N} I_j(x_j^d)\right) \quad \text{(Eq. 1)}$$

where $I_i(x)$ represents the color value of the pixel x in the initial image $I_i$ acquired by the i-th camera of the camera array, and $I_j(x_j^d)$ represents the color value of the pixel $x_j^d$ in the initial image acquired by the j-th camera of the camera array.

At the pixel level, the rendering of a slice of focal stack thus consist in retrieving, within each initial images acquired by the camera array, the pixel corresponding to the projection of a given 3D scene point, and then averaging the color values of the N pixels retrieved.

The image slice $S^d$ appears sharp at pixel x when all color values $I_1(x_1^d), \ldots, I_i(x), \ldots, I_N(x_N^d)$ represent the same color value, meaning that the scene point rendered at pixel x is placed at a depth d from the i-th camera and that this scene point is visible from all cameras points of view, i.e. there's no occlusion.

Conversely, the image slice $S^d$ does not appear sharp at pixel x if $I_1(x_1^d), \ldots, I_i(x), \ldots, I_N(x_N^d)$ do not all represent a same color value. This is the case when the scene point rendered at pixel x has a depth different than the focalization distance d. This also may be the case if the scene point rendered at pixel x is partially occluded, which means that this scene point is not visible from at least one camera of the camera array (in that case, the subset of cameras that don't see the considered scene point "pollute" the rendered point: even if the scene point is placed at a depth d from the i-th camera and was therefore supposed to be rendered sharp at pixel x, the color values obtained within said subset of cameras are different than $I_i(x)$, because of occlusions).

From the previous considerations, it should be noticed that the depth of field of a slice of focal stack is very shallow, since only the points of the scene at a distance d from the i-th camera are rendered sharp. Points at a distance d+ε or d−ε for a small ε are already rendered blur.

Figure 2:
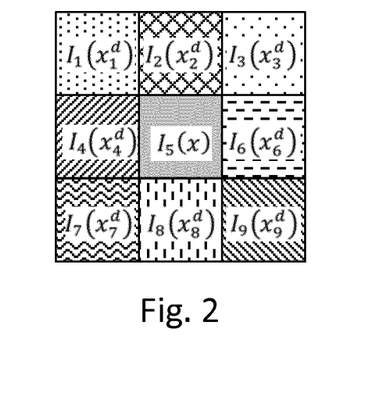
FIG. 2 is a schematic illustration for explaining how some color values are obtained within initial images acquired by a camera array, and averaged to render a final refocused image, according to a prior art synthetic aperture refocusing technique.

Considering a three-by-three camera array similar to the one presented in relation with FIG. 1, FIG. 2 is a schematic illustration showing an example of the nine color values $I_1(x_1^d), I_2(x_2^d), I_3(x_3^d), I_4(x_4^d), I_5(x), I_6(x_6^d), I_7(x_7^d), I_8(x_8^d), I_9(x_9^d)$ that may be obtained in association with a pixel x, called a current pixel, of a slice of focal stack $S^d$ to be rendered. In the example of FIG. 2, $S^d$ is the slice of focal stack focused at a distance d from camera C5 of the camera array, and the scene point rendered at pixel x has a depth different than d. As a consequence, the nine color values $I_1(x_1^d), \ldots, I_4(x_4^d), I_5(x), I_6(x_6^d), \ldots, I_9(x_9^d)$ are not all the same (the different patterns used in FIG. 2 stand for different color values). Current pixel x is thus supposed to be rendered blur in $S^d$, meaning that it belongs to an out-of-focus region of $S^d$. According to prior art classical synthetic aperture refocusing technique, only these nine color values are supposed to be averaged to determine the color value of the current pixel x within the slice of focal stack $S^d$.

Figure 5A:
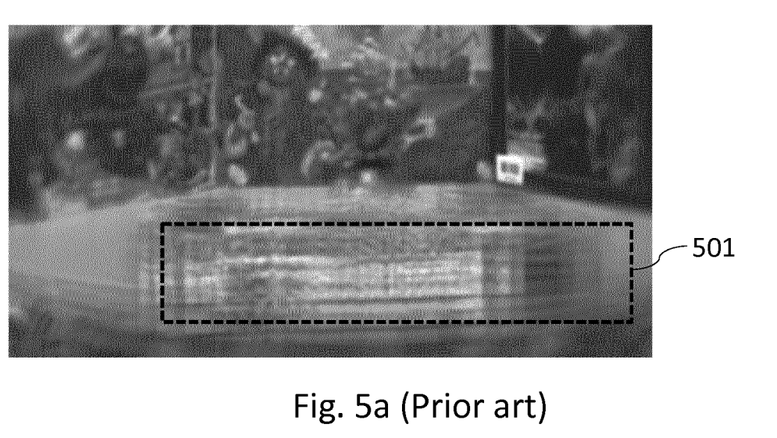
FIGS. 5a and 5b are example of final images respectively rendered using a classical prior art synthetic aperture refocusing technique (FIG. 5a), and using a proposed technique according to one embodiment of the present disclosure (FIG. 5b), from the same initial images acquired by a four-by-four camera array.

As already described in relation with prior art, while the points in $S^d$ appearing sharp are rendered in a pretty good quality, the blur points are poorly rendered as soon as the number of cameras in the camera array is rather small (which is the case with a three-by-three camera array). Indeed, because of the poor sampling of the light-field, this conventional method of Synthetic Aperture Refocusing, when performed on initial images acquired by a camera array, is known to create angular aliasing in the blur regions of the rendered image. FIG. 5a illustrates this drawback of prior art. It shows an example of an image rendered using such a classical synthetic aperture refocusing technique, performed on initial images acquired by a four-by-four camera array. As it can be clearly noticed in this image, blur regions such as region 501 are rendered as the addition of several images where high frequencies are clearly visible: angular aliasing (pattern repetition) appears in these blur regions. The image thus lacks realism and aesthetic quality.

The technique of the present disclosure, which is described below through various embodiments, is aimed at overcoming some of these drawbacks of the prior art. In at least one embodiment, it allows reducing the angular aliasing that may appear within out-of-focus regions of a refocused image rendered from initial images acquired by a camera array.

Figure 3:
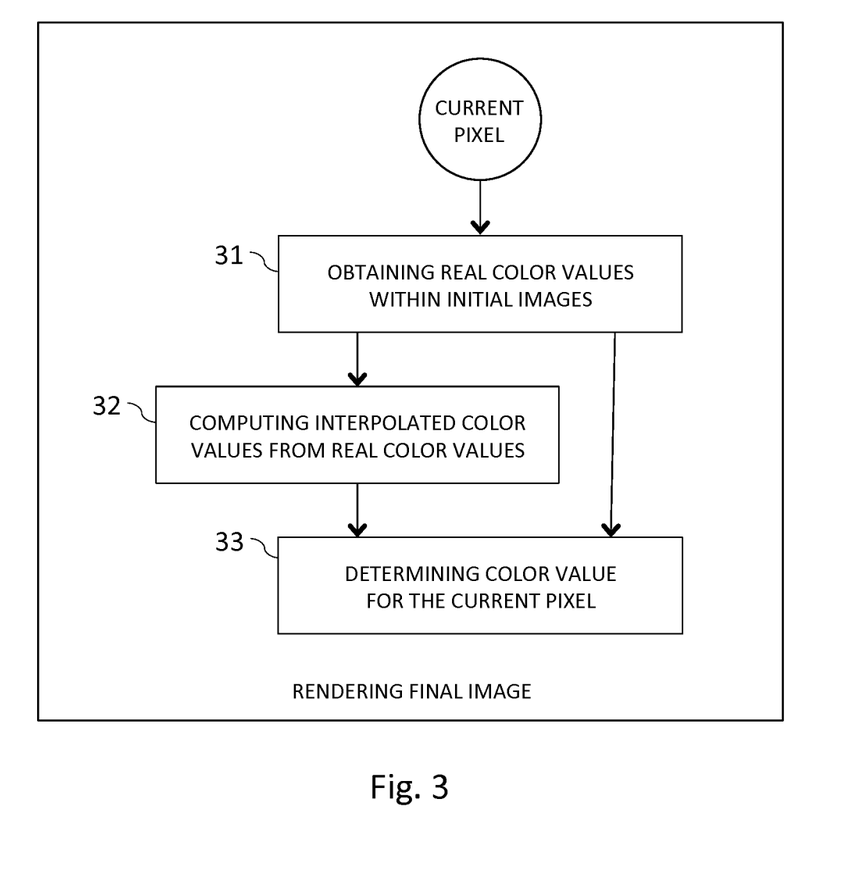
FIG. 3 is a flow chart for illustrating the general principle of the proposed technique for rendering a final image from at least one image acquired by a camera array, according to an embodiment of the present disclosure.

FIG. 3 is a flow chart for explaining a method for rendering an image, called a final image, from at least one image acquired by a camera array, according to an embodiment of the present disclosure. This method relies on a peculiar technique for determining a color value for at least one pixel of the final image, called a current pixel.

Figure 1B:
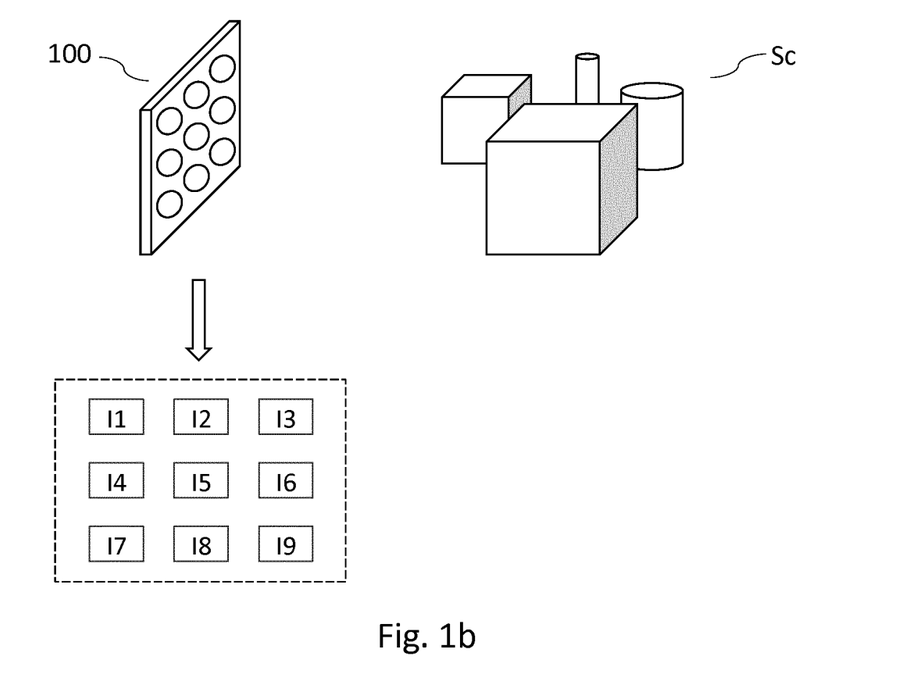

For purposes of simplification, it is assumed that the camera array is a three-by-three camera array similar to the one introduced in relation with FIGS. 1a and 1b, and that the final image to be rendered is a slice of focal stack (being understood that other kind of final images may be rendered, for example by combining different slices of the focal stack rendered with the proposed technique). For example, the final image to be rendered is a slice of focal stack $S^d$ focused at a distance d from the camera C5 of the camera array. The camera array is assumed to be calibrated. As already seen previously, it is thus possible to retrieve, from the current pixel, pixels corresponding to the projection, in each camera (C1, C2, ... C9) image plane, of the 3D scene point associated with the current pixel at a given depth from camera C5. Throughout the rest of the document, expressions of the form "pixel associated with said current pixel within an initial image" are used to refer to a pixel of an initial image acquired by a camera array, which corresponds to such a projection of a 3D scene point associated with the current pixel. The notations already used in relation with FIG. 2 are kept (for example, $x_j^d$ represents the pixel corresponding to the projection in the j-th camera image plane, of the 3D scene point associated with the current pixel x at a given depth d from the reference camera C5).

At step 31, for at least one initial image acquired by the camera array, a color value of a pixel associated with said current pixel within said at least one initial image is obtained. Such a color value is referred to as a "real color value" throughout the rest of the document, in contrast to the notion of "interpolated color value" that will be introduced afterwards, in relation with step 32.

At step 31, for at least one initial image acquired by the camera array, a color value of at least one pixel, called neighbour pixel, located in the vicinity of the pixel associated with said current pixel within said at least one initial image is obtained. Such a neighbour pixel may be located on a same row or on a same line of the pixel associated with said current pixel. Such a color value is also referred to as a "real color value" throughout the rest of the document. Step 31 thus acquires a set of real color values for the current pixel and a set of real colors for the at least one neighbour pixel.

Figure 4:
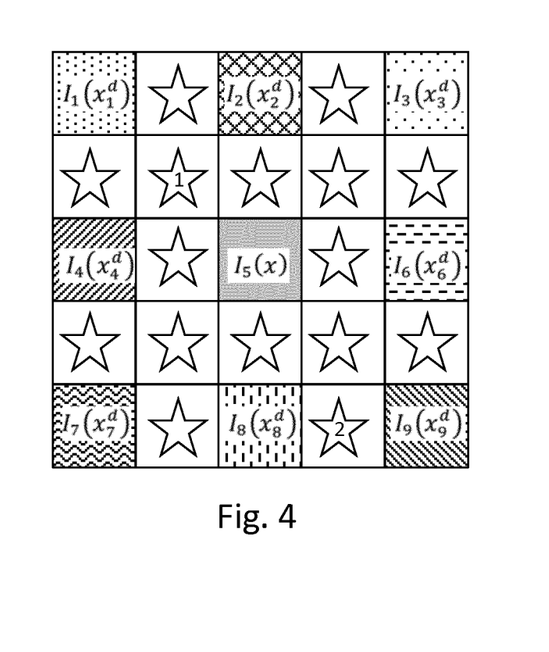
FIG. 4 is a schematic illustration for explaining how some color values obtained within initial images acquired by a camera array are used to compute some interpolated color values, according to an embodiment of the present disclosure.

At step 32, the real color values previously obtained for the current pixel and the real color values previously obtained for the at least one neighbour pixel are used to compute at least one interpolated color value for the current pixel. The principle of step 32 consists in performing angular interpolation of the color values of the light-field captured by the camera array. Some examples of such an interpolation are presented in relation with FIG. 4. A new color value is for example interpolated for the current pixel from real color values $I_1(x_1^d), I_2(x_2^d), I_4(x_4^d)$ and $I_5(x)$ obtained for the current pixel at step 31 from initial images I1, I2, I4 and I5 respectively acquired by camera C1, C2, C4 and C5 as well as from real color values $I_1(x_1^d \pm k), I_2(x_2^d \pm k), I_5(x_5^d \pm k)$ and $I_4(x \pm k)$ obtained for the at least one neighbour pixel at step 31 from initial images I1, I2, I4 and I5 respectively acquired by camera C1, C2, C4 and C5. This new color value for the current pixel may be interpolated as $\frac{1}{8}(I_1(x_1^d)+I_2(x_2^d)+I_4(x_4^d)+I_5(X)+I_1(x_1^d \pm k)+I_2(x_2^d \pm k)+I_5(x_5^d \pm k)+I_4(x \pm k))$, so that such an interpolated color value may be considered as an acceptable approximation of the color value that may have been obtained for the current pixel within an initial image that would have been acquired by a camera placed at the position of the star numbered 1 in FIG. 4, i.e. between cameras C1, C2, C4 and C5 in the camera array. Another interpolation of a color value for the current pixel may be performed from real color values $I_8(x_8^d)$ and $I_9(x_9^d)$ of the current pixel obtained at step 31 from initial images I8 and I9 respectively acquired by camera C8 and C9 as well as from real color values $I_8(x_8^d \pm k)$ and $I_9(x_9^d \pm k)$ of the at least one neighbour pixel obtained at step 31 from initial images I8 and I9 respectively acquired by camera C8 and C9, as $\frac{1}{4}(I_8(x_8^d)+I_9(x_9^d)+I_8(x_8^d \pm k)+I_9(x_9^d \pm k))$. Again, such an interpolated color value for the current pixel may be considered as an acceptable approximation of the color value that may have been obtained for the current pixel within an initial image that would have been acquired by a camera placed at the position of the star numbered 2 in FIG. 4, i.e. between cameras C8, and C9 in the camera array. In other words, step 32 may be considered, to some extend, as the interpolation of virtual cameras placed between or beside the real cameras of the camera array. Step 32 thus acquires a set of interpolated color values for the current pixel.

At step 33, the color value for the current pixel is determined, as a function of both at least one real color value of a pixel associated to the current pixel as well as a at least one real color value of at least one neighbour pixel. For example, the color value for the current pixel is determined by averaging all the real color values of the pixels associated to the current pixel as well as a at least one real color value of at least one neighbour pixel (in contrast with a classical prior art synthetic aperture refocusing technique, in which only real color values of the current pixel are averaged). In this manner, a camera array comprising more cameras than its number of real cameras may be simulated. For example, a five-by-five camera array may be simulated from a three-by-three camera array when determining the color value of a current pixel, by computing an interpolated color value for every position identified by a star in FIG. 4. The proposed technique thus allows simulating a better angular sampling of the light-field captured by a camera array.

Any interpolation method (nearest neighbours interpolation, bilinear interpolation, etc.) may be applied to compute the interpolated color of of the current pixel. However, according to one embodiment, a nearest neighbors interpolation method is applied, since the inventors have noticed during their test that such an interpolation already produces satisfying results at a small computational cost. It should also be noted that the terms "interpolation from at least one real color values" used with regard to step 33 should be taken in a broad sense: the computation of a new interpolated color value may be performed not only directly from real color values, but as well from previously interpolated color values (since the real color values are always at the origin of all the interpolated color values).

Figure 5B:
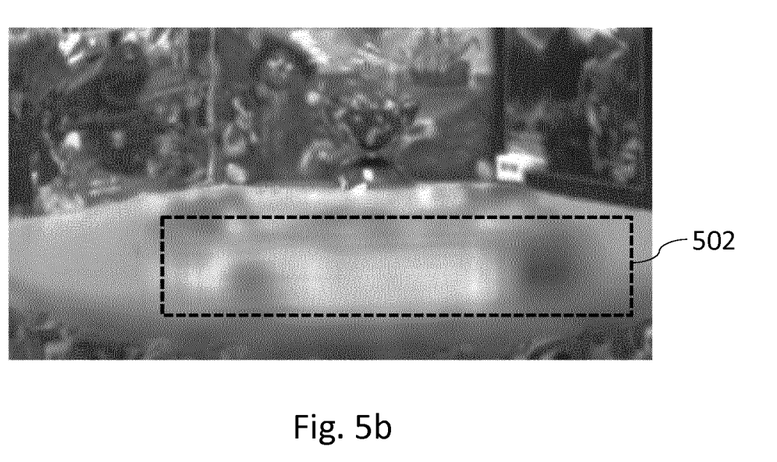

FIGS. 5a and 5b show examples of final images respectively rendered using a classical prior art synthetic aperture refocusing technique (FIG. 5a), and using a proposed technique according to one embodiment (FIG. 5b). These final images are both rendered from the same initial images acquired by a same camera array (a four-by-four camera array). FIG. 5a has already been described in relation with prior art synthetic aperture refocusing technique. Due to the poor angular sampling of the light-field captured by the camera array, there is angular aliasing and pattern repetition appears in blurred regions such as region 501. FIG. 5b has been rendered according to one embodiment of the rendering technique of a final image. As it can be noticed for example in the out-of-focus region 502, the rendered blur is of better quality when compared to the one rendered in corresponding out-of-focus region 501 of FIG. 5a, with a clear diminution of the angular aliasing.

The general principle of the present technique being now introduced, we present thereafter several embodiments that may be implemented to perform the interpolation of new color values, or to use such interpolated color value when determining the color value of a current pixel of a final image to be rendered. The person skilled in the art will observe that the embodiments depicted can be combined and modified in various forms.

We now assume that the real depth of the scene captured by the camera array is known, and has already been computed with any known method. For example, a depth image (which is sometimes referred to as depth data or depth map in the literature) has already been computed from the initial images acquired by the camera array, and is available. The depth image is for example a 2D representation (i.e. an image) of the 3D scene, in which each pixel is associated with depth or disparity information. Such information is representative of the distance of objects of the scene from a reference point, such as the position of the camera C5, if we still consider a camera array similar to the one introduced in relation with FIGS. 1a and 1b.

According to one embodiment, the rendering method is applied specifically to pixels belonging to an out-of-focus region of the final image. Out-of-focus pixels may easily be identified, since the focalization distance of the final image is known as being predetermined by a user, and since the real depth of the scene is also known (for example through the depth image). No interpolated color values are computed for pixels belonging to a sharp region of the final image (in-focus pixels): as in prior art synthetic aperture refocusing technique, only the real color values are averaged to determine the color value to be rendered for these in-focus pixels. This embodiment allows at the same time improving the blur within out-of-focus region, while saving computational power by avoiding computing unnecessary interpolated color values for pixels appearing sharp within the final image (sharp region of the final image are already rendered in a pretty good quality—about the same quality as the initial images—with a classical synthetic aperture refocusing technique).

According to another embodiment of the present disclosure, the number of interpolated color values computed at step 32, and further used at step 33 when determining the color value for a current pixel, is function of a difference between a depth of said current pixel and a depth of an in-focus region of said final image. More particularly, in one embodiment, the number of interpolated color values increases as said difference between a depth of said current pixel and a depth of an in-focus region of said final image increases. Indeed, as already described with reference to prior art, angular aliasing that appears in out-of-focus regions of classical synthetic aperture refocused image becomes even more apparent in out-of-focus regions having high defocus degree with respect to in-focus regions of the rendered image. The proposed embodiment thus allows adapting the number of interpolated color values of the current pixel to that defocused degree. In other words, the higher the defocused degree of an out-of-focus region is, the higher the simulated sampling of the light field is (as already seen, the interpolation of color values may be considered, to some extend, as the interpolation of virtual cameras placed between or beside the real cameras of the camera array). In that way, the computational cost of the implementation of the technique of the present disclosure is optimized, while still preserving good blur quality at every defocus depth.

Figure 6A:
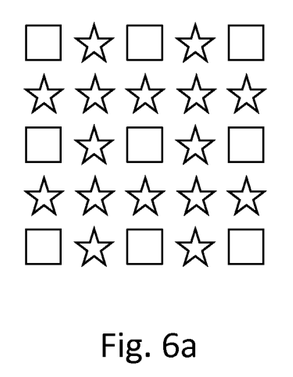
FIGS. 6a and 6b show how depth information may be used to adapt the number of interpolated color values to compute, according to an embodiment of the present disclosure.
Figure 6B:
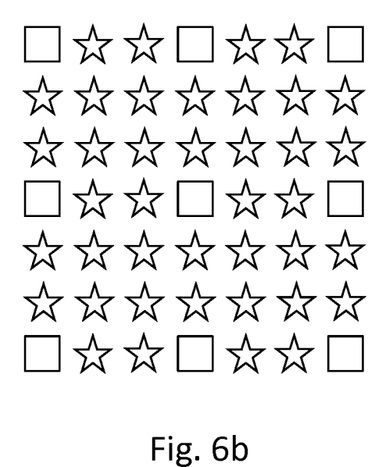

FIGS. 6a and 6b illustrate such an embodiment. On these figures, squares stand for real color values obtained within initial images acquired by the real cameras of a camera array for the current pixel, whereas stars represent interpolated color values for the current pixel (which may be seen as values obtained from initial images acquired by interpolated virtual cameras of the camera array). The configuration of FIG. 6b corresponds to a case in which the considered out-of-focus current pixel has an higher defocus degree than the current pixel considered in the configuration of FIG. 6a, meaning that more virtual cameras are to be rendered in order to have a good angular sampling of the light-field and avoid angular aliasing.

According to one feature of this embodiment, the number of color values to interpolate depends linearly of the defocus degree of the considered current pixel, with respect to a depth d of the in-focus regions of the rendered image. More particularly, the number $N_{Virtual}$ of virtual cameras interpolated between two real cameras of the camera array for a given current pixel may be defined in several ways. For example $N_{Virtual}$ may be defined as:

$$N_{Virtual}=[[\alpha|D(x)-d|+\beta]]$$

where [[.]] is the integer part operator and D(x) is the depth of the current pixel ($\alpha$ and $\beta$ being some predetermined constants).

Alternatively, $N_{Virtual}$ may be defined as:

$$N_{Virtual}=[[s_i^d-s_{i+1}^d]]$$

where $[[s_i^d-s_{i+1}^d]]$ represents the number of pixels between the projected point $s_i^d$ of the reference camera in the slice image plane and the projected point $s_{i+1}^d$ of a neighbor camera (such a distance also depends on |D(x)−d|).

Figure 7A:
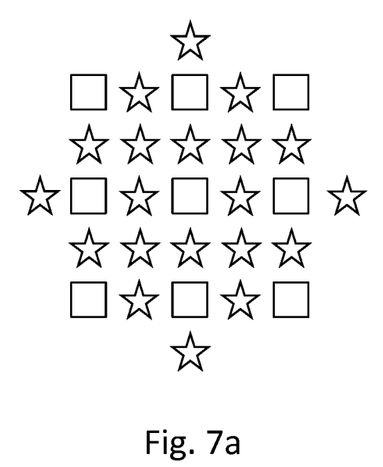
FIGS. 7a and 7b illustrate two different synthetic aperture shapes that may be obtained according to an embodiment of the present disclosure, allowing changing the blur shape in a final rendered image.
Figure 7B:
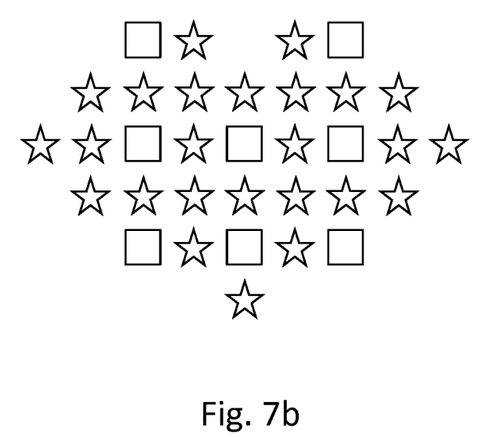

According to another embodiment, the real color values of the current pixel and the interpolated color values that are used to determine the color value for said current pixel of the final image are determined as a function of a predetermined blur shape. The proposed technique indeed allows defining the shape of a virtual synthetic aperture to be rendered, by interpolating only the specific interpolated color values and by selecting only the specific real color values that will contribute to form that shape. While the configurations described in relation with FIG. 6 illustrate a square aperture that synthetizes the aperture a camera would have if such a camera has a lens of the size of the camera array, other synthetic aperture shapes may be rendered. For example, FIGS. 7a and 7b illustrate two different synthetic aperture shapes that may be created by interpolating more or less specific interpolated color values, and by selecting some specific real color values among the ones that may be obtained. As in FIGS. 6a and 6b, squares stand for real color values for the current pixel obtained within initial images acquired by the real cameras of a camera array, whereas stars represent interpolated color values (which, again, may be seen as values obtained from initial images acquired by interpolated virtual cameras of the camera array). In other words, FIGS. 7a and 7b show two different synthetic aperture shapes that may be created by interpolating more or less virtual cameras and by including all or a subset of the real cameras of a camera array. The fact that the proposed technique enables to create different synthetic aperture shapes is of interest, since the aperture shape has a direct influence on the aesthetic quality of the blur produced in out-of-focus regions of the rendered image. The aesthetic quality of such a blur is usually referred to as the bokeh, which may be defined as "the way a lens renders out-of-focus points of light". More particularly, the aperture shape contributes to determine the blur shape within out-of-focus regions of the final image. According to a particular feature, it should be noticed that the present embodiment allows producing different blur shape (or bokeh shape) within different out-of-focus regions of the final image, for example depending on their depths. Indeed, assuming that the depth of a scene is known (though a depth image for example), it is possible to adopt different strategies when computing the interpolated color values from the real color values. For example, the synthetic aperture shape of FIG. 7a may be defined for out-of-focus pixels of a given depth, while the synthetic aperture shape of FIG. 7b may be defined for out-of-focus pixels of a another depth.

According to another embodiment, the determination of the color value of a current pixel, as described in relation with step 33 of FIG. 3, may be done in several ways. It may for example consist in determining an arithmetic average of the real color values of the current pixel and the interpolated color values respectively provided by steps 31 and 32. Alternatively, it may consist in determining a weighted average of said real color values of the current pixel and interpolated color values. For example, a Gaussian kernel may be applied to these values, giving a higher weight to the camera at the centre of a camera array, and a smaller one to the border cameras.

As it can be noticed from the previous described embodiments, the proposed technique not only allows reducing angular aliasing within out-of-focus regions of images rendered from initial images acquired by a camera array, but it also offers many different rendering possibilities that would not be possible with a conventional camera or by performing prior art classical synthetic aperture refocusing technique from initial images acquired by a camera array. More particularly, it is possible to render images with a blur model that can change for every pixel or group of pixels within the rendered image. For example, it is possible to render blur effect that may vary across the image, but may be constant across each same-depth region of the image, usually corresponding to coherent part of the scene (such as identified objects within the scene).

It should also be noticed that the proposed technique is an image post-processing technique: it does not require any material or structural change of the camera array to be implemented. To some extent, it may be applied to a set of initial images of a same scene seen from different points of view that is not acquired by a camera array.

It is to be understood that the present disclosure can be embodied in various forms, and is not to be limited to the examples discussed above. In particular, while the proposed technique has been described mainly with reference to the rendering of final contents that are images, it may also be applied for the rendering of video contents, without departing from the scope of the present disclosure.

Figure 8:
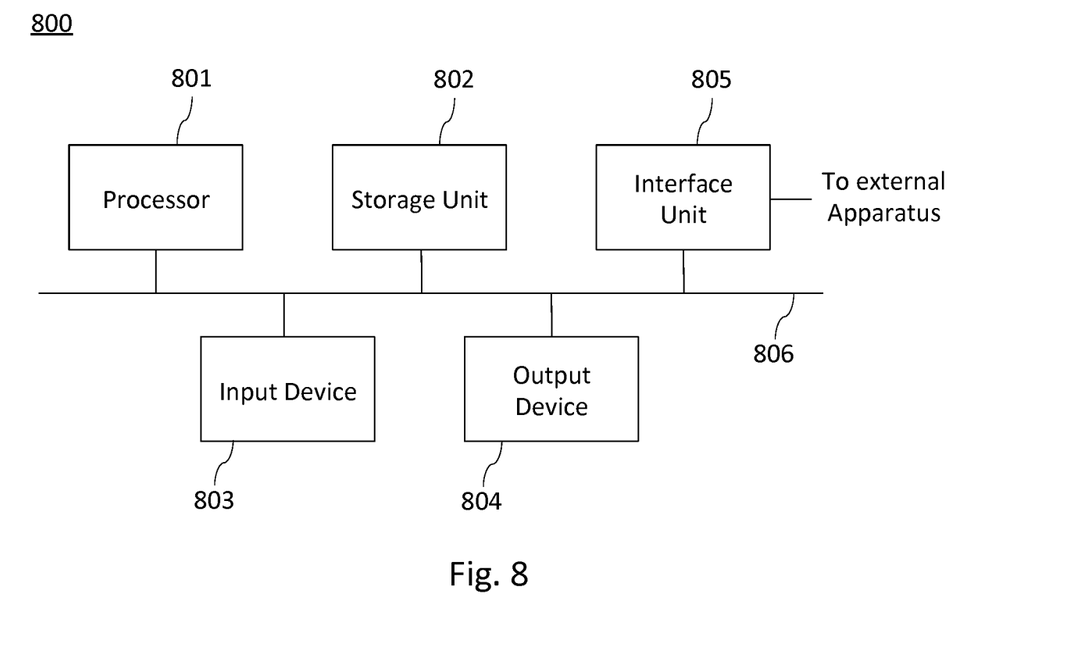
FIG. 8 is a schematic block diagram illustrating an example of an apparatus for rendering a final image, from at least one image acquired by a camera array, according to an embodiment of the present disclosure.

FIG. 8 is a schematic block diagram illustrating an example of a device for rendering an image, called a final image, from at least one image acquired by a camera array, according to an embodiment of the present disclosure. Such a device may be any device in which the processing of images acquired by a camera array may be of interest: a computer, a set-top box, a TV set or any portable handheld device such as a smartphone, a tablet, or a camera-array-based light-field capture device for example.

An apparatus 800 illustrated in FIG. 8 includes a processor 801, a storage unit 802, an input device 803, an output device 804, and an interface unit 805 which are connected by a bus 806. Of course, constituent elements of the computer apparatus 800 may be connected by a connection other than a bus connection using the bus 806.

The processor 801 controls operations of the apparatus 800. The storage unit 802 stores at least one program to be executed by the processor 801, and various data, including for example depth information, parameters used by computations performed by the processor 801, intermediate data of computations performed by the processor 801, and so on. The processor 801 is formed by any known and suitable hardware, or software, or a combination of hardware and software. For example, the processor 801 is formed by dedicated hardware such as a processing circuit, or by a programmable processing unit such as a CPU (Central Processing Unit) that executes a program stored in a memory thereof.

The storage unit 802 is formed by any suitable storage or means capable of storing the program, data, or the like in a computer-readable manner. Examples of the storage unit 802 include non-transitory computer-readable storage media such as semiconductor memory devices, and magnetic, optical, or magneto-optical recording media loaded into a read and write unit. The program causes the processor 801 to perform a process for rendering an image, called a final image, from at least one image acquired by a camera array, according to an embodiment of the present disclosure as described previously. More particularly, the program causes the processor 802 to determine a color value to apply to at least one pixel of the final image, called a current pixel. The real color values of the current pixel and interpolated color values used to determine this color value of the current pixel may be stored into storage unit 802.

The input device 803 is formed for example by a keyboard, a pointing device such as a mouse, or the like for use by the user to input commands. In embodiments wherein the final image rendering is performed within a camera-array-based light-field capture device itself, the input device 803 also comprises the optical device used to capture the scene.

The output device 804 is formed for example by a display device to display, for example, the final image determined by applying the method for rendering previously described. The input device 803 and the output device 804 may be formed integrally by a touchscreen panel, for example. The input device 803 may be used by an operator for selecting regions that are to be in focus within the rendered image.

The interface unit 805 provides interfaces between the apparatus 800 and external apparatus. The interface unit 805 may be communicable with external apparatus via cable or wireless communication. In one embodiment, the external apparatus may be a display device, for displaying the final image rendered by the rendering device.

Although only one processor 801 is shown on FIG. 8, it must be understood that such a processor may comprise different modules and units embodying the functions carried out by apparatus 800 according to embodiments of the present disclosure, such as modules allowing determining a color value for at least one pixel of the final image, called a current pixel:

- a module for obtaining, for at least one initial image acquired by a camera array, a color value of a pixel associated with said current pixel within said at least one initial image, acquiring at least one color value called a real color value;
- a module for obtaining, for at least one initial image acquired by a camera array, a color value of a neighbour pixel, acquiring at least one color value called a real color value;
- a module for obtaining at least one interpolated color value from the previously acquired real color values;
- a module for determining the color value for said current pixel, as a function of said at least one real color value of an associated pixel and said at least one interpolated color value.

These modules and units may also be embodied in several processors 801 communicating and co-operating with each other.

The invention claimed is:

1. A method comprising:
receiving at least an initial image acquired by a camera array, said initial image having a real color value and at least one associated pixel;
obtaining a color value of a pixel located in a vicinity of said pixel associated with said real color value;
interpolating the values of said pixel of said color value and said neighboring pixel to determine a current pixel to be used in a final rendering, said current pixel having sharp contours and colors; and
performing an angular interpolation of the color values of the real color value and the neighbor color value and their associated pixels to determine a blurred area for said final rendering; and
rendering a final image with sharp and blurred areas from said interpolations and calculation of said current pixel.

2. The method of claim 1, wherein said current pixel is an out-of-focus pixel, belonging to a blurred region of said final image.

3. The method of claim 1, wherein computing at least one interpolated color value from said at least one real color value comprises performing a nearest neighbors interpolation.

4. The method of claim 2, wherein computing at least one interpolated color value consists in computing a number of interpolated color values, said number being a function of a difference between a depth of said current pixel and a depth of an in-focus region of said final image.

5. The method of claim 4, wherein said number of interpolated color values increases as said difference between a depth of said current pixel and a depth of an in-focus region of said final image increases.

6. The method of claim 1, wherein said at least one real color value and said at least one interpolated color value used to determine the color value for said current pixel are determined as a function of a predetermined blur shape.

7. The method of claim 1, wherein determining the color value for said current pixel comprises determining an arithmetic average of said at least one real color value and said at least one interpolated color value.

8. The method of claim 1, wherein determining the color value for said current pixel comprises determining a weighted average of said at least one real color value and said at least one interpolated color value.

9. A device for rendering an image, called a final image, from at least one image acquired by a camera array, wherein said device comprises, for the determination of a color value for at least one pixel of the final image, called a current pixel:

a module for receiving at least an initial image acquired by a camera array, said initial image having a real color value and at least one associated pixel;
a module for obtaining, obtaining a color value of a pixel located in a vicinity of said pixel associated with real color value;
a module for interpolating the values of said pixel of said color value and said neighboring pixel to determine a current pixel to be used in a final rendering, said current pixel having sharp contours and colors; and
a module for obtaining a color value of a pixel located in a vicinity of said pixel associated with said current pixel to be used in a final rendering; said current pixel having sharp contours and colors; and
a module for performing an angular interpolation of the color values of the real color value and the neighbor color value and their associated pixels to determine a blurred area for said final rendering; and
a module for rendering a final image with sharp and blurred areas from said interpolations and calculation of said current pixel.

10. A non-transitory computer program product downloadable from a communication network and/or recorded on a medium readable by a computer and/or executable by a processor, comprising program code instructions for implementing a method comprising:

receiving at least an initial image acquired by a camera array, said initial image having a real color value and at least one associated pixel;

obtaining a color value of a pixel located in a vicinity of said pixel associated with said real color value;

interpolating the values of said pixel of said color value and said neighboring pixel to determine a current pixel to be used in a final rendering, said current pixel having sharp contours and colors;

performing an angular interpolation of the color values of the real color value and the neighbor color value and their associated pixels to determine a blurred area for said final rendering; and rendering a final image with sharp and blurred areas from said interpolations and calculation of said current pixel.

11. A non-transitory computer-readable medium comprising a computer program product recorded thereon and capable of being run by a processor, including program code instructions for implementing a method comprising:

receiving at least an initial image acquired by a camera array, said initial image having a real color value and at least one associated pixel;

obtaining a color value of a pixel located in a vicinity of said pixel associated with said real color value;

interpolating the values of said pixel of said color value and said neighboring pixel to determine a current pixel to be used in a final rendering, said current pixel having sharp contours and colors;

performing an angular interpolation of the color values of the real color value and the neighbor color value and their associated pixels to determine a blurred area for said final rendering; and rendering a final image with sharp and blurred areas from said interpolations and calculation of said current pixel.

* * * * *